United States Patent Office 3,464,857
Patented Sept. 2, 1969

---

3,464,857
METHOD OF PREPARING PREGELATINIZED STARCH COMPOSITIONS
Nicholas G. Marotta, Green Brook, and Harvey Bell, North Plainfield, N.J., assignors to National Starch and Chemical Corporation, New York, N.Y., a corporation of Delaware
No Drawing. Filed May 29, 1967, Ser. No. 642,217
Int. Cl. C13l *1/08;* A23l *1/14*
U.S. Cl. 127—71                    6 Claims

ABSTRACT OF THE DISCLOSURE

Coarsely ground, water dispersible starch compositions prepared by pregelatinizing a starch base while in the presence of, and in intimate admixture with, a sugar component. The resulting instant starch compositions may be utilized in the preparation of a wide variety of food products.

---

Conventional instant starches, i.e. starch products which are dispersible in water which is at room temperature, are typically prepared by means of a procedure which involves pregelatinizing the starch, i.e. subjecting the starch to a degree of heat sufficient to swell and ultimately burst its normally intact granules, and thereafter grinding the resulting product to a very fine particle size. However, upon attempting to disperse such starches in water, excessive lumping is prone to occur thereby preventing the formation of a smooth, uniform starch dispersion. Moreover, where equal weights of a diluent, such as sugar, have been pre-blended with the starch component of such finely ground products in order to prevent the occurrence of such lumping, undesirable grainy dispersions have resulted which have proven to be decidedly inferior to the pastes which result from the use of conventional, untreated starches which require cooking in order to be adequately dispersed in water.

In order to overcome the lumping phenomenon, the technique of coarse grinding these instant starches has been resorted to. Although this procedure has substantially reduced the lumping tendency, it, nevertheless, has markedly increased the amount of undesirable grainy texture which is present in the resulting starch dispersions. It thus appears that ready dispersibility and smooth, uniform dispersions are, to a great extent, mutually exclusive properties on the part of the prior art instant starches.

It is, thus, the prime object of this invention to prepare pregelatinized starch compositions which are readily dispersible in unheated liquids so as to yield smooth, non-grainy dispersons therein. Various other objects and advantages of this invention will become apparent from the following description thereof.

We have now, surprisingly, found that by intimately blending a starch base with a sugar component and thereup gelatinizing and coarse grinding the resulting blend, it becomes possible to readily disperse the resulting instant starch product without the formation of lumps while, still, obtaining substantially smooth, non-grainy dispersions therefrom. It would thus appear to be the presence of the sugar component during the gelatinization of the starch in conjunction with the coarse grinding of the thus treated blend that permits the preparation of these novel instant starches in a form which is greatly improved over the comparable products of the prior art.

The applicable starch base materials which may be used in the novel process of this invention may be derived from any plant source including corn, potato, sweet potato, wheat, rice, sago, tapioca, sorghum or the like as well as the high amylose containing varieties of the latter starches, i.e. starches containing at least about 50%, by weight of amylose. Also applicable are the conversion products derived from any of the latter bases including, for example dextrines prepared by the hydrolytic action of acid and/or heat; oxidized starches prepared by treatment with oxidants such as sodium hypochlorite; and, fluidity or thin boiling starches prepared by enzyme conversion or by mild acid hydrolysis. In addition, the amylose fraction derived from any of the above noted starch bases may also be utilized. It is also possible to employ any substituted ether or ester derivative of these starch bases or of their amylose fractions.

The other essential ingredient of the novel water dispersible starch blends of this invention is the sugar component. In referring herein to sugars, we contemplate the use of all commonly utilized mono- and disaccharides, and materials containing them such as dextrose, starch syrup, levulose, sucrose and invert sugar as well as the polyhydric alcohols such as glycerol, sorbitol and mannitol. In addition, it should be noted that other food grade, hydrophilic, hydroxyl-containing materials may also, if desired, be effectively utilized as the second or sugar component of our novel blends.

In general, the procedure utilized for preparing the novel water dispersible starch blends of this invention involves the thorough blending of the desired starch base with the sugar component, slurrying the resulting blend in water until all of the solids are thoroughly wet, and thereupon drum drying the resulting slurry; the latter process involving the passing of the slurry over heated rollers which heat the slurry above the gelatinization point of the starch base present therein while also evaporating the water therefrom so as to ultimately yield dry, solid particles comprising a mixture of pregelatinized starch and sugar. Other mechanical means of accomplishing the latter gelatinization step, e.g. spray drying, flash drying and extrusion, etc., may also be utilized if so desired by the practitioner. It should be noted, however, that the drum drying procedure is most economical and efficient for the purposes of this invention.

The drum drying conditions, e.g. the temperature and drum speeds, under which the starch-sugar blends are gelatinized and dried will, of course, vary according to the particular formulation and its specific end use application, although it may be noted that excellent results have been obtained in the drum drying process when the drums are heated to a temperature ranging from about 160 to 180° C. and are rotating at a rate of about 4 to 9 revolutions per minute. In addition, it should be noted that the above described procedure may be varied by pre-cooking the starch base, prior to drum drying, as by the use of a boiling water bath, a swept-surface heat exchanger, or a jet cooker apparatus. The use of any of the latter procedures thus enables the practitioner to utilize lower drum temperatures and drum speeds and also permits a reduction in the overall time required for the drum drying operation.

The starch-sugar blends resulting from the drum drying process are ordinarily in the form of thin, solid sheets which must then be pulverized in order to provide particles of which no more than about 25%, by weight, can be retained on a #12 U.S. Standard Sieve while no more than about 60%, by weight, should pass through a #100 U.S. Standard Sieve. Thus, the use of starch-sugar blends which contain more than about 60%, by weight, of −100 material, i.e. particles which will pass through a #100 mesh screen, will result in the formation of lumps when such blends are dispersed in water while the dispersions thus produced will be characterized by their grainy, non-uniform appearance. It is seen, therefore, that such finely ground products offer no advantages over the instant starches of the prior art.

It is most important to note that there should not be any variations with regard to the sequence of steps utilized in preparing the novel products of this invention. Any deviations from the prescribed sequence of steps, such, for example, as drum drying the starch base prior to the addition thereto of the sugar component, may adversely effect the dispersibility of the resulting blends. Thus, the use of the blends resulting from the latter sequence of steps results in the formation of lumpy, non-uniform dispersions as opposed to the smooth, uniform dispersions which result from conducting the novel process of this invention in the prescribed manner.

With regard to proportions, the concentration of the sugar component present in the novel blends of this invention may range from about 5 to 50%, and preferably from about 20 to 25%, as based on the total weight of the dry blend, i.e. the combined weight of the starch and sugar components. The weight ratio of starch solids to water which is present in the initial slurry may range from about 1:1 to 1:2.

A wide variety of optional additives may be incorporated into the starch-sugar blends of this invention either prior to, or after, the gelatinization thereof. Prominent among these additives are sweetening, flavoring and coloring agents, etc. It should be noted that the inclusion of such additives has no adverse effect upon the excellent properties exhibited by our novel pregelatinized blends.

The many excellent characteristics exhibited by the novel blends of this invention, and particularly their ready dispersibility, permit them to be used in a wide range of applications including the preparation of such dry, instant products as puddings, pie fillings, icings, fudge mixes, soups, drinks, sauces gravies salad dressings, relishes and barbecue sauces, etc. These dry mixes are readily reconstituted by admixture with an appropriate amount of liquid, e.g. water, milk, fruit juices, etc., in order to be put in their final edible form.

In the following examples, which further illustrate the embodiment of this invention, all parts given are by weight unless otherwise specified.

Example I

This example illustrates the method utilized for the preparation of the novel starch-sugar blends of this invention.

A dry blend comprising 60 parts of corn starch and 40 parts of sucrose was prepared by thoroughly agitating the combined ingredients. The resulting blend was slurried with 100 parts of water until all the solids were completely wet. This slurry was then subjected to a drum drying process whereby it was placed on drums which were heated to a temperature of 170° C. and which were rotating at a speed of about 7 revolutions per minute; the mass thus being heated and simultaneously gelatinized and dried. The resulting product was then pulverized so as to obtain a product wherein all of the particles were in the −12 +100 size range, i.e. they all passed through a #12 U.S. Standard Sieve but were retained on a #100 U.S. Standard Sieve.

Thereupon, 16.7 parts of the above described pregelatinized, coarse ground blend was added, under agitation, to 100 parts of water. During the dispersion procedure, the complete absence of lump formation was noted. Furthermore, the resulting aqueous dispersion exhibited a smooth, uniform appearance.

Example II

This example illustrates the wide variety of starch bases and sugar components which can be effectively used in preparing the novel pregelatinized blends of this invention.

The general preparative procedure set forth in Example I, hereinabove, was utilized to prepare the formulations described in the following table:

| Formulation No. | Parts | | | | | | | | | |
|---|---|---|---|---|---|---|---|---|---|---|
| | 1 | 2 | 3 | 4 | 5 | 6 | 7 | 8 | 9 | 10 |
| INGREDIENTS | | | | | | | | | | |
| A waxy maize starch which had been inhibited and acetylated by treatment with a 9:1 adipic acid-acetic anhydried mixed reagent; the resulting product containing 1.8%, by weight, of acetyl groups | 60 | 90 | 75 | 75 | | | | | | |
| A tapioca starch which had been inhibited by treatment with 0.06%, by weight, of epichlorohydrin and acetylated by treatment with 4%, by weight, of acetic anhydride | | | | | 65 | 90 | | | | |
| Potato starch | | | | | | | 75 | | | |
| Corn starch | | | | | | | | 80 | | |
| A waxy maize starch | | | | | | | | | 75 | |
| A high amylose corn starch containing 55%, by weight, of amylose | | | | | | | | | | 75 |
| Glycerol | | | | | 25 | | | | | |
| Sucrose | 40 | | | | | 10 | | | | |
| Corn syrup | | 10 | | | 35 | | 25 | 20 | | 25 |
| Dextrose | | | | 25 | | | | | | |
| Lactose | | | | | | | | | 25 | |
| Water | 100 | 100 | 100 | 100 | 100 | 100 | 100 | 100 | 100 | 100 |

Each of the resulting pregelatinized, coarse ground blends was then, respectively, dispersed in 100 parts of water. The amount of each blend which was dispersed was determined according to the following equation: $x = 1000/y$ wherein $x$ represents the parts of each blend which was dispersed in the water and $y$ represents the weight percent of starch in the pregelatinized blend.

In each instance, lumping was completely absent during the dispersion procedure. Furthermore, each dispersion exhibited a smooth, uniform appearance which was substantially free of grainy texture.

Example III

This example illustrates the necessity for having a sugar product present in our novel compositions and also illustrates the need for coarse grinding the resulting pregelatinized blend to within the specified particle size range.

The procedure set forth in Example I, hereinabove, was utilized to prepare the formulations described in the following table. The table also indicates the type of grinding that each blend was subjected to. Thus, where "coarse grinding" is indicated, the resulting product contained only particles in the −20 +100 size range, while "fine grinding" serves to indicate that 80%, by weight, of the particles of the resulting product were sufficiently finely ground so as to be able to pass through a #200 mesh screen.

|  | Parts | | | | | |
|---|---|---|---|---|---|---|
| Formulation No. | 1 | 2 | 3 | 4 | 5 | 6 |
| INGREDIENTS | | | | | | |
| A waxy maize starch which had been inhibited and acetylated by treatment with a 9:1 adipic acid-acetic anhydride mixed reagent; the resulting product containing 1.8%, by weight, of acetyl groups | 60 | 100 | 60 | | | |
| A tapioca starch which had been inhibited by treatment with 0.06%, by weight, of epichlorohydrin and acetylated by treatment with 4%, by weight, of acetic anhydride | | | | 75 | 100 | 75 |
| Corn syrup | 40 | | 40 | 25 | | 25 |
| Water | 100 | 100 | 100 | 100 | 100 | 100 |
| Type of grinding | Coarse | Coarse | Fine | Coarse | Coarse | Fine |

Each of the resulting blands was then, respectively, dispersed in 100 parts of water, the amount of blend so dispersed being determined according to the formula set forth in Example II, hereinabove. Each of the blends was then rated according to the degree of lump formation exhibited during its dispersion as well as with respect to the degre of graininess present in the ultimate dispersion prepared therefrom.

The results of these determinations are presented in the following table:

| Formulation No. | Degree of lumping | Degree of grain |
|---|---|---|
| 1 | None | Smooth. |
| 2 | do | Excessive. |
| 3 | Excessive | Smooth. |
| 4 | None | Do. |
| 5 | do | Excessive. |
| 6 | Excessive | Smooth. |

The results summarized above clearly indicate the necessity for the presence of sugar in the original blend as well as the need for the coarse grinding of the resulting pregelatinized blend in order to achieve the exceptional dispersion characteristics exhibited by the novel water dispersible starch compositions of this invention.

Summarizing, this invention is thus seen to provide novel pregelatinized starch blends which exhibit excellent dispersion characteristics.

Variations may be made in proportions, procedures and materials without departing from the scope of this invention which is defined by the following claims.

We claim:
1. A method for the preparation of a water dispersible, dry starch composition comprising the steps of: (1) blending a starch base with a sugar component; (2) mixing the resulting blend with water; (3) simultaneously drying said blend and gelatinizing the starch base component thereof; and (4) coarse grinding the dried mixture thus obtained.

2. The method of claim 1, wherein said sugar component is present in the initial blend in a concentration of from about 5 to 50%, by weight.

3. The method of claim 1, wherein the weight ratio of starch solids to water in the mixture of step (2) ranges from about 1:1 to 1:2.

4. The method of claim 1, wherein the drying of the aqueous mixture of the starch base and the sugar component and the simultaneous gelatinization of the starch base component thereof is effected by heating said aqueous mixture to a degree sufficient to gelatinize the granules of the starch base component and to simultaneously remove the water from said mixture.

5. The method of claim 1, wherein said starch composition is coarse ground to the extent that no more than 25%, by weight, of its particles will be retained on a #12 U.S. Standard Sieve and no more than about 60%, by weight, of its particles will pass through a #100 U.S. Standard Sieve.

6. The method of claim 1, wherein said starch composition is coarse ground to the extent that all of its particles will pass through a #12 U.S. Standard Sieve but will be retained on a #100 U.S. Standard Sieve.

References Cited
UNITED STATES PATENTS
2,818,356 12/1957 Shookhoff _____ 127—29 X
3,222,220 12/1965 Wurzburg _____ 127—33 X

OTHER REFERENCES
E. E. Hester et al., Cereal Chem., 33, 91–101 (1956).

MORRIS O. WOLK, Primary Examiner

SIDNEY MARANTZ, Assistant Examiner

U.S. Cl. X.R.

99—139, 141, 144, 199; 127—29, 33